March 18, 1958
W. SMITH ET AL
2,827,562
ILLUMINATING COMPARATOR
Filed Dec. 3, 1954
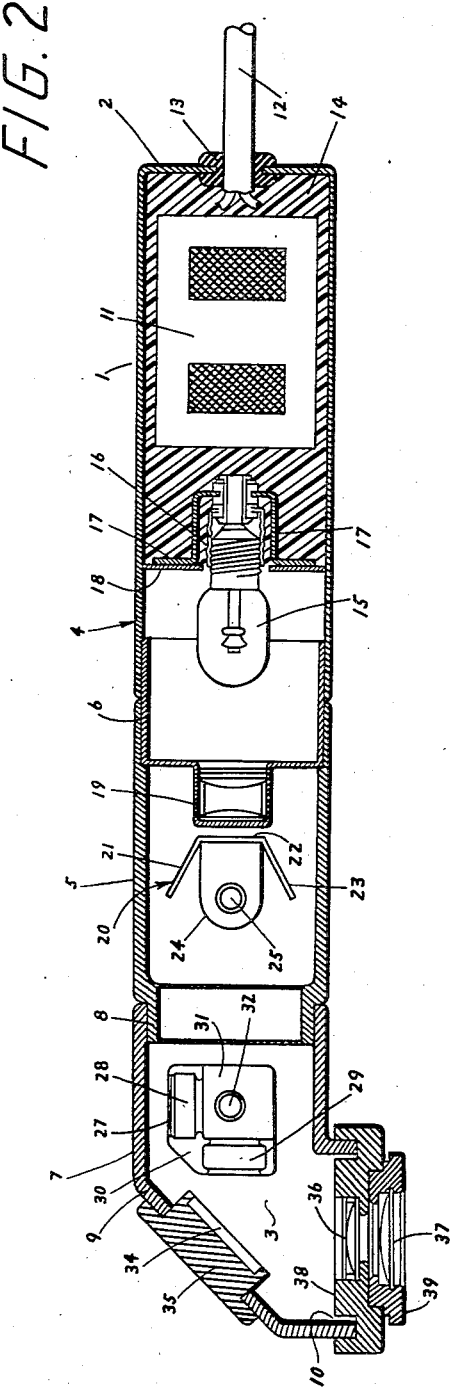
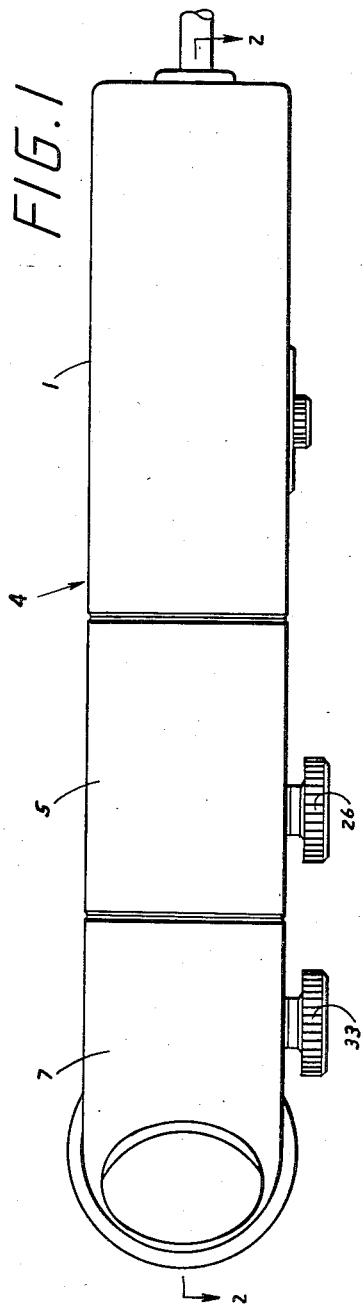
INVENTORS.
ALVIN D. CEDERBAUM & WILLIAM SMITH
BY
EZEKIEL WOLF
THEIR ATTORNEY

United States Patent Office 2,827,562
Patented Mar. 18, 1958

2,827,562

ILLUMINATING COMPARATOR

William Smith, Brookline, Mass., and Alvin D. Cederbaum, New Rochelle, N. Y.

Application December 3, 1954, Serial No. 472,922

1 Claim. (Cl. 240—41)

The present invention relates to a comparator, and more particularly to an instrument for comparing the effects of artificial light and daylight upon various types of objects.

It is an object of the present invention to provide an electrical instrument for alternately focusing artificial light and daylight upon a desired object whereby the appearance of that object under the different types of light may be studied.

It is also an object of the present invention to provide an instrument for the purpose described which is of inexpensive design and construction and which may readily be transported and stored. Another object of the present invention is to provide a light comparator of the type described in which provision is made to vary the size of the light beams focused upon the objects being studied. These and other objects of the present invention will be more clearly understood when considered in connection with the accompanying drawings in which:

Figure 1 is a top plan view of the invention, and,

Figure 2 is a cross sectional view taken along line 2—2 of Figure 1.

In the present invention, there is provided an elongated casing 1, closed at one end 2 and terminating in an elbow bend section 3 at the other end. This casing may, if desired, be formed of several sections in which the lamp end section 4 is secured to the center section 5 by means of an inner collar element 6 about which the sections 4 and 5 fit tightly. The end section 7 containing the elbow bend portion fits about a shoulder 8 formed at the end of the section 5. The end section 7 has a bevelled portion 9, having an opening to receive a mirror described later, and an open end 10 covered by condensing lenses also hereinafter described. At the closed end 2, there is provided a transformer 11 having power supplied through the electrical cord 12 which passes through the end 2 through the grommet opening 13. This transformer is held in position by a potting compound 14. The power from the secondary of this transformer is electrically connected with the light 15 which is preferably in the nature of a 10 watt lamp. This lamp 15 is supported in a socket 16 which in turn is held in position by the bracket element 17 and the partitioning member 18 to which the bracket member 17 is secured. Secured to the collar 6 is the bracket 19 which contains a pair of planar convex lenses designed to condense the light rays of the lamp 15 through the stop member 20. This stop member 20 is formed with three plates 21, 22 and 23 secured together to form an angular element. Each of these three plates 21, 22 and 23 are provided with openings of different sizes through which the condensed rays from the lamp 15 may selectively pass. This stop element 20 is supported at its sides by a pair of side flanges 24 extending from the side edges of the plate 22. Each of these flanges 24 have openings through which supporting pivots 25 project with the other end of the pivot 25 pivotably secured in the wall 5. One of these pivots 25 extends through the wall of the casing and is provided with a control dial 26 which is adapted to selectively adjust any one of the plates 21, 22 or 23 into alignment with the condensed rays from the lamp 15. Positioned within the section 7 is the filter assembly 27. This assembly comprises a daylight lens 28 and an artificial light lens 29 secured at a side edge to a supporting member 30 and at right angles to one another. This filter assembly is pivotably supported by side flange members 31 on either side of the lenses, which in turn are supported by pivot elements 32 extending into the side walls of the section 7. A dial control 33 positioned on the outside of the wall 7 is secured to one of these pivots 32 and controls the rotation of the artificial light and daylight lenses, whereby the operator by rotating the dial 33 may selectively position either one of these lenses in front of the condensed light rays after they have passed through the stop assembly 20. Positioned in the elbow section 9 of the casing is a mirror 34 adapted to receive the filtered rays from the lamp and reflect them through the end of the casing and through the condensing lens positioned thereon. This mirror may be formed of any of the usual materials and is supported on a cap element 35 which in turn is adapted to thread into an opening in the elbow section 9, and is thereby minutely adjustable for proper focusing of the rays directed onto it. At the lower end of the casing there is provided a pair of condensing lenses 36 and 37 supported respectively in supporting elements 38 and 39. The supporting element 38 may be a snap on assembly fitting closely over the opening at the end of the casing while the supporting element 39 may be of the threaded variety and is threaded over the lens 36.

In the operation of this device, the light rays emitted by the lamp 15 pass through the condensing lenses within the bracket 19 and through the opening in the selected plate 21, 22, or 23. They then pass through either the artificial or the daylight lens of the filter and are reflected by the mirror 34 through the pair of condensing lenses onto an object being examined at the focal distance. By rotating the handle 33 the object under examination may be compared readily under both artificial light and daylight.

Having now described my invention, I claim:

A light comparator comprising an elongated three section tube with said sections interconnected by engaging shoulder means, said sections comprising first, second, and third sections with the second section being the center section and the third section having an elbow bend therein, a step down transformer and power supply cord, therefor, positioned within said first section, a light bulb operatively connected to the secondary of said transformer, a pair of condensing lenses for condensing the light source axially of the tube, a frame supporting said condensing lenses comprising a sleeve member coaxial with said tube and engaging the inner wall thereof on either side of the shoulder means between said first and second end sections, a stop member comprising a frame pivoted normally on the inner sidewall of the tube in said second section on an axis directed across the tube, said frame having a plurality of stop members adapted to be rotated successively in front of said condensing lenses, a filter lens assembly comprising a frame pivoted normally on the inner sidewall of the tube in the third section adjacent the elbow bend, said filter lens assembly comprising two filters carried in said assembly at right angles to one another and parallel to the axis of the pivoted frame, means for rotating the frame for selecting one of the filters for the light to pass through, a pair of condensing lenses, a removable frame supporting said last mentioned lenses with said frame secured over the free end of said third section, a reflecting mirror in said elbow for directing light impinging thereon through said last mentioned condensing lenses and means for adjustably positioning said mirror.

References Cited in the file of this patent

UNITED STATES PATENTS

| | | |
|---|---|---|
| 978,910 | Lewis | Dec. 20, 1910 |
| 1,608,726 | De Zeng | Nov. 30, 1926 |
| 2,078,586 | Richter | Apr. 27, 1937 |
| 2,399,568 | Banker | May 7, 1946 |
| 2,471,879 | Lowber et al. | May 31, 1949 |
| 2,616,342 | Thompson | Nov. 4, 1952 |